United States Patent [19]

Robertson

[11] 3,887,339

[45] June 3, 1975

[54] INDUSTRIAL TECHNIQUE

[75] Inventor: Donald Hancher Robertson, Madison Heights, Va.

[73] Assignee: The United States of America as represented by the United States Energy Research and Development Administration, Washington, D.C.

[22] Filed: Nov. 19, 1973

[21] Appl. No.: 417,434

[52] U.S. Cl.......................................... 55/66; 55/84
[51] Int. Cl............................................. B01d 53/14
[58] Field of Search ...................... 55/66, 84; 62/17

[56] References Cited
UNITED STATES PATENTS

| | | | |
|---|---|---|---|
| 3,494,104 | 2/1970 | Royer | 55/67 |
| 3,742,720 | 7/1973 | Ferguson et al. | 55/66 |

OTHER PUBLICATIONS

Stephenson et al., "Experimental Investigation of the Removal of Krypton and Xenon from Contaminated Gas Streams by Selective Absorption in Fluorocarbon Solvents," NBS Report No. K1780, Aug. 17, 1970.
Chemical Engineering, Vol. 78 No. 22, 10-4-71, pp 55 to 57.

Primary Examiner—Charles N. Hart
Attorney, Agent, or Firm—Dean E. Carlson; David S. Zachry; F. O. Lewis

[57] ABSTRACT

Techniques for selectively extracting and storing only krypton and xenon in the waste gases that are released from a pressurized water nuclear power reactor are described. The illustrative fluorocarbon absorption system has three separation stages: an initial gas-fluorocarbon absorber, a flash chamber and fractionator for segregating all of the absorbed gases from the loaded absorber stage fluorocarbon (save for the krypton and xenon), and a stripper that receives the partially loaded fluorocarbon liquid directly from the fractionator in order to separate only the krypton and xenon. A molecular sieve filter dries the input process gas, a cartridgetype solvent filter is used to remove radiation degradation products from the loaded liquid that flows from the absorber, a cold trap gas drier is provided to remove residual solvent vapor from the separated krypton and xenon, and radiation detectors automatically activate valves to establish safe conditions in the event an accident or plant failure.

3 Claims, 1 Drawing Figure

PATENTED JUN 3 1975  3,887,339
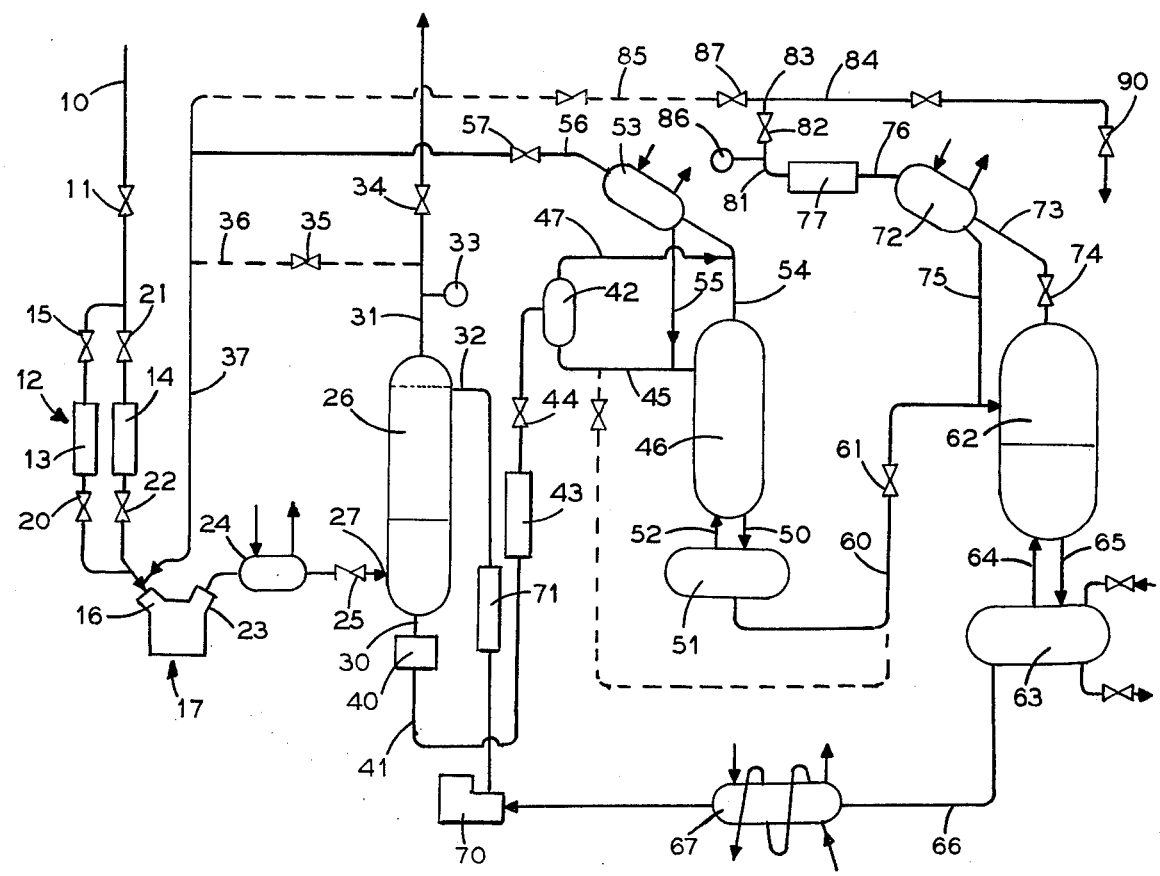

INDUSTRIAL TECHNIQUE

BACKGROUND OF THE INVENTION

1. Field of the Invention

This invention was made in the course of, or under, a contract with the United States Atomic Energy Commission.

The invention relates to waste gas treatment systems for nuclear power reactors and, more particularly, to the segregation of krypton and xenon from power reactor waste gases through selective absorption and desorption in dischlorodifluoromethane, and the like.

2. Description of the Prior Art

Frequently, there is a need to separate individual gases from gas mixtures. Among the many gas separation systems that have been advanced, some proposals and research have been directed to selective absorption and desorption of gases in fluorocarbon liquids. In this respect, the "Process For The Separation of Components From Gas Mixtures" that is described in U.S. Pat. application Ser. No. 189,543, filed Oct. 15, 1971 by James R. Merriman, et al., is typical.

The system described in this Merriman, et al., patent application is directed to the selective separation of gases in order to produce tons per day of product gases. In this manner, oxides of carbon, sulfur, and nitrogen can be stripped from the input feed gas. To achieve this separation, the feed gas (which can contain trace amounts of krypton and xenon) is pumped at a rate of 7 cubic feet per minute at standard atmospheric conditions (scfm) to about 21.4 atmospheres pressure before it is passed through a dryer and through a cooler and a chiller in order to bring the feed gas temperature to −25°F. This cold gas is passed upwardly through a packed column absorber in counterflow with a downflowing liquid dichlorodifluoromethane ($CCL_2 F_2$). The soluble gas components, which in this instance might include carbon dioxide ($CO_2$), krypton (Kr) and xenon (Xe) in addition to other less soluble gases, dissolve in the liquid and flow out of the bottom of the absorber column to a heat exchanger and a "flash chamber." Unabsorbed gases, moreover, are vented from the absorber column and collected for storage or further processing.

The solvent, now loaded with absorbed gases, is subjected to 3 atmospheres pressure at 30°F in the flash chamber. In these conditions, some of the solvent is vaporized and part of the absorbed gases come out of solution. A condenser liquifies the vaporized solvent and, in this way separates the solvent from the now liberated gases. These gases (including some krypton and xenon) are recirculated to the pump inlet for recycling, while the liquified solvent from the condenser is combined with the downflowing liquid solvent from the flash chamber in a fractionator column.

Upwardly flowing vaporized solvent from a fractionator reboiler is contacted with the downflowing and partially gas-loaded solvent in the fractionator column. This upwardly flowing vapor further absorbs some of the gases in the downflowing liquid and joins the vapor from the flash chamber in the condenser. The liquid solvent that flows from the fractionator column to the fractionator reboiler is enriched in one of the oxides (e.g., carbon dioxide), krypton and xenon. This enriched liquid is drawn from the fractionator reboiler and is sent to the top of a stripper column by way of a stripper column flash chamber and condenser combination that is similar to the set which is provided for the fractionator column. In these circumstances, however, the downflowing liquid solvent contacts an upwardly rising solvent vapor within the stripper column at a lower pressure and temperature than the fractionator in order to drive the remaining absorbed gases from the solvent.

These gases are driven off in the stripper condenser and the gaseous oxide, mixed with krypton and xenon, is taken from the stripper condenser for venting or storage, as appropriate.

It is important to note, however, that the illustrative carbon dioxide gas that is vented from the stripper condenser is not pure, but is a combination of more than 80% carbon dioxide with the balance of the gas being a mixture of nitrogen, oxygen, argon, and trace amounts of krypton and xenon. For large scale industrial operations "separating" carbon dioxide in this adulterated form may be quite acceptable. There are important needs, however, for a system that can isolate a mixture of only the trace amounts of the rare gases, krypton and xenon, with essentially the complete elimination of all other gases and contaminants.

In this latter respect, the primary coolant water that is used to transfer heat from the core of a nuclear power reactor usually acquires an inventory of dissolved gases. Although these gases can be extracted from the primary coolant water, many of the gas components are radioactive and, as a consequence, cannot be discharged directly to the atmosphere. These radioactive gases must be stored at the reactor site until the natural radiation decay processes reduce the concentrations of the active elements to an environmentally acceptable level. Radioactive isotopes of nitrogen and oxygen decay to negligible levels of activity rather swiftly. The radioactive isotopes of krypton and xenon, in contrast, have substantially longer decay periods. It is largely because of these long decay times that characterize the small concentrations of rare gases in the over-all mixture that many power reactor installations must have decay tanks for holding all of the gas for a period of 45 to 60 days.

This is an inefficient and expensive way to cope with the radioactive waste gas treatment problem. The large volume of stored gas, moreover, also creates a further problem in view of the possibility that some accident or other unforeseen circumstance could produce a dangerous leak or a massive release of radioactive gases.

Clearly, there would be a significant improvement if the short-lived radioactive gases could be efficiently, safely, and inexpensively separated from the trace quantities of longer-lived radioactive krypton and xenon. If this separation could be effected, substantially smaller volumes of mixed gases need be stored in a less extensive decay tank volume. The holding time in the decay tank would be reduced to match the period that is required to render the shorter-lived radioactive nitrogen and oxygen harmless. If separated, the trace quantities of radioactive krypton and xenon can be stored with greater safety and less expense for long periods of time in small volume containers.

The selective fluorocarbon absorption system for large volume gaseous oxide separation does not readily lend itself to trace gas isolation that is needed to completely segregate the krypton-xenon mixture from all of the other gases in the feed gas. It will be recalled in this connection that the gas liberated in the final stripper column stage of the illustrative prior art system is a composite of carbon dioxide, nitrogen, oxygen, and argon as well as traces of krypton and xenon. A system of this sort cannot separate only a mixture of krypton and xenon for the desired concentrated storage. Further in this regard, it should be noted that the radiations emitted from the dissolved radioactive gases produce adverse chemical changes in the solvent that tend to degrade the process efficiency.

Accordingly, there is a need for a system that will separate small quantities of krypton and xenon from a mixture with other gases, to the effective exclusion of these other gases. This system, moreover, must be not only capable of safe and efficient operation in the presence of radiation, but also must occupy a small volume that is commensurate with the quantities of gases that are being separated.

SUMMARY OF THE INVENTION

These needs are satisfied, to a large extent, through the practice of the invention. In this regard, the process gas feed is first drawn through a molecular sieve dryer to reduce the dew point of this gas mixture to $-150°F$ before the mixture reaches the compressor. Typically, the process gas will comprise one or more carrier gases and trace amounts of krypton and xenon. The compressor increases the process gas pressure to a value that is between 350 and 400 pounds per square inch (psi). A cooler reduces the process gas to a temperature range of $-20°$ to $-30°F$ before the process gas is admitted to the bottom of an absorber column. Downwardly flowing liquid dichlorodifluoromethane in the absorber column absorbs essentially all of the krypton and xenon and some of the carrier gas. The decontaminated carrier gas is discharged from the top of the absorber column to the atmosphere.

In accordance with a feature of the invention, however, the vent from the absorber column is equipped with a radiation monitor. This monitor, in response to the intensity of the observed radioactivity in the discharged gas automatically activates a pair of valves that close the vent and recycle the too-radioactive gas back through the compressor and the absorber column.

The solvent flowing from the bottom of the absorber column is "loaded" with absorbed gases. This loaded solvent flows through a cartridge-type filter unit after it leaves the absorber column. This filter, an improvement that characterizes the invention, not only traps moisture, oils, acids and other impurities within the solvent but also removes most of the degradation products within the solvent that are caused by radiation exposure, e.g., hydrogen halides.

The filtered and loaded liquid solvent flows through a heater and into a flash tank at the inlet to a fractionator column. The loaded solvent is partially vaporized in the flash tank, the still-liquid solvent flowing into the top of the fractionator column and the gas and vapor flowing into a fractionator condenser. The condenser returns the vaporized solvent to a liquid state and combines this liquid with the still-liquid solvent that flows from the flash tank to the fractionator. The condenser also couples the liberated gases to the compressor input for recycling through the system.

As the solvent flows down through the fractionator column, an upwardly counterflowing solvent vapor drives the last of the carrier gas (along with some krypton and xenon) out of the downflowing liquid. This gas and vapor flows out through the top of the fractionator and into the fractionator condenser. As mentioned above, the condenser liquifies the vapor for downflow through the fractionator column and recycles the liberated gases back through the system by way of the compressor inlet.

Liquid solvent and the absorbed krypton and xenon flowing from the bottom of the fractionator column are introduced directly into the top of a still lower pressure stripper column for counterflow contact with an upwardly rising fresh solvent vapor. The solvent vapor desorbs the krypton and xenon from the downflowing liquid. Desorbed rare gases and solvent vapor then flow out through the top of the stripper column and into a stripper condenser. Solvent liquifaction in the stripper condenser separates the solvent from the desorbed krypton and xenon.

The gases from the stripper condenser, in accordance with another feature of the invention, are further purified in a product gas drier. Preferably, a cold trap that reduces the product gas temperature to $-110°F$ will remove residual solvent vapor from the liberated rare gases to further purify these gases and, in this manner, to reduce the long-term radioactive gas storage volume.

An additional control over the purity of the rare gases that are piped to the storage tanks is provided by a further radiation meter that is in stream with the product gas drier. In response to the radioactive intensity of the gases flowing past the meter, and hence, the purity or quality of the krypton and xenon mixture under observation, the meter generates a signal that selectively introduces the gases to storage, or to the inlet side of the compressor, as appropriate.

This invention, it has been found, has an overall process efficiency of 99.0% to 99.9%. It can, moreover, be mounted on a transportable skid that occupies a volume that is approximately 10 feet long by 10 feet wide by 15 feet high.

Thus, there is provided in accordance with the invention an efficient and compact system for segregating radioactive krypton and xenon from a mixture of gases, in which the rare gas concentration is in a range from 0.1 to 500 parts per million (ppm).

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE DRAWING

The sole FIGURE of the drawing is a schematic diagram of a typical plant that embodies principles of the invention.

DETAILED DESCRIPTION OF THE PREFERRED EMBODIMENTS

For a more complete appreciation of the invention, attention is invited to the drawing. Radioactive gas from the decay tanks (not shown) that temporarily store waste gases from nuclear power plants and the like flow into the waste gas treatment system through an inlet conduit 10. The gas may have, for example, the following composition:

Moisture 0 to saturation at feed gas inlet conditions
Hydrogen 0 to 100%
Nitrogen 0 to 100%
Air 0 to 100% (hydrogen<3.5%)
Krypton - 0.1 to 500 ppm
Xenon - 0.1 to 5,000 ppm The feed gas, at ordinary atmospheric temperature and pressure flows through a valve 11 to a feed gas dryer 12. The dryer comprises a pair of parallel connected drying towers 13 and 14 that each contain a desiccant column 1.5 inches in diameter and 8 feet tall. Preferably, the desiccant may comprise a "molecular sieve," or crystalline alkali metal aluminosilicate with a three-dimensional interconnecting network structure of silica and alumina tetrahedra of the type that is identified as 8–12 mesh beads of Grade 514, 4A Molecular Sieve sold by Davison Chemical Division of W. R. Grace and Co. and described in the Davison Chemical Division, Pigment, Additives and Absorbents Department leaflet titled "Davison Molecular Sieves Grade Chart."

The drying tower 13 is connected to the conduit 10 through an inlet valve 15 and to an inlet 16 of a compressor 17 through an outlet valve 20. In a similar manner, the drying tower 14 also is selectively connected from the inlet conduit 10 through an inlet valve 21 and to the compressor inlet 16 through an outlet valve 22.

The compressor 17 can be, for example, of triple diaphragm construction with an integral leak detection system. A compressor capacity of 3.0 cubic feet per minute, measured at standard atmospheric conditions (SCFM), and a compressor discharge pressure of 374 pounds per square inch absolute (psia) are adequate for the purposes of the invention. Illustratively, Pressure Products Industries Q series diaphragm compressors described in Bulletin 40-4C are suitable with the system described herein.

Process gas under a pressure in the 300 to 400 psi range is pumped through a compressor discharge 23 to a cooler or gas chiller 24. The gas chiller reduces the temperature of the compressed process gas to less than $-27°F$. It has been found that with a process gas flow rate of 1 SCFM, a total chiller thermal duty of approximately 1,400 Btu/h and a surface area of 2.6 ft$^2$ will provide the desired temperature reduction.

The cooled and pressurized process gas flows through a check valve 25 and into the lower portion of a vertically disposed absorber 26. A typical construction for the absorber 26 would include a column of Goodloe Packing that is 9 feet in length and 2 inches in diameter. Goodloe Packing is a commercial product obtainable from Packed Column Corporation of 48 Brown Ave., Springfield, N.J. 07081 and described in more complete detail in Packed Column Corporation Application Bulletin No. A 711.

As shown in the drawing, the absorber 26 has a lower inlet 27 for admitting the pressurized and cooled process feed gas to the packing column. A liquid drain 30 is connected to the bottom of the absorber. The top of the absorber 26 is equipped with a vapor discharge conduit 31 and a fluorocarbon liquid inlet 32. It is preferable that the liquid to gas (L/G) molar ratio within the absorber 26 should be 15 with an absorber operating pressure of 374 psia. In this illustrative embodiment of the invention the preferred liquid or solvent, used in the system under consideration is dichlorodifluoromethane, frequently referred to as Freon-12, Genetron-12, or Refrigerant-12. Other fluorocarbon compounds, moreover, are suitable for use in connection with the invention.

In accordance with a feature of the invention, a radiation meter 33 is coupled instream with the vapors that flow through the discharge conduit 31. The radiation meter 33 produces a signal in response to the radiation level within the discharge conduit 31 to automatically close or open a solenoid valve 34 that is downstream in the vapor discharge conduit 31 from the radiation meter 33.

The signal from the radiation meter 33 also is coupled to a solenoid activated valve 35 to open and close the valve 35 in response to the radiation intensity in the discharge conduit 31. The valve 35 controls vapor flow through a bypass conduit 36 that connects the discharge conduit 31 to a recycle conduit 37. As shown, the recycle conduit 37 admits gases and vapors from the process equipment back into the system through the compressor inlet 16.

In practicing the invention, the radiation meter 33 can include a Victoreen plastic phosphor scintillation detector that is sensitive to beta rays. The detector should be encased in a combination steel and lead vessel for gas pressure containment and radiation shielding. A small gas or vapor sampling chamber, moreover, should be provided in the vessel adjacent to the plastic scintillator. The radiation meter 33 also should be installed in a vent or discharge conduit, or in a conduit that is provided with a safety relief valve set at some value that is less than the pressure rating of the radiation detector in order to prevent overpressure damage.

As shown in the drawing, the vapor discharge conduit 31 vents itself directly to the atmosphere only when the radiation level of the discharging gas is within acceptable environmental and health physics levels as a result of the combination of the radiation meter 33 and the solenoid valves 34 and 35.

The chilled and pressurized process feed gas flowing upward through the absorber 26 transfers essentially all of the krypton and xenon and some of the carrier gas to the downwardly counterflowing fluorocarbon solvent liquid that is discharged from the liquid inlet 32. The clean carrier gas flows through the conduit 31, past the radiation meter 33, through the valve 34 and into the atmosphere. The solvent liquid that flows out of the bottom of the absorber 26 through the liquid drain 30 is loaded with radioactive krypton and xenon, as well as with some of the carrier gas (or gases). This loaded solvent flows through an impurities filter 40, which, in accordance with another feature of the invention, removes most of the degradation products in the solvent that result from radiation (e.g., hydrogen halides). The filter 40 will, of course, trap other impurities of which moisture, oil and acids are typical. Preferably a cartridge-type filter unit with a thirty day replacement life will be adequate for the purpose of the invention.

Differential pressure forces loaded liquid to flow from the filter 40 through a conduit 41 to a fractionator flash tank 42 by way of a heater 43 and valve 44 that is downstream from the heater 43. The heater 43 increases the temperature to about 95°F with an expenditure of about two kilowatts. The heated liquid enters the flash tank 42 and part of the solvent is vaporized. In this respect about 20% of the liquid that flows into the flash tank is vaporized. A typical design for the flash tank 42 would involve a vertically disposed cylindrical vessel with a nominal 4 inch diameter and a 24 inch overall length. The loaded solvent enters the flash tank 42 through a ½ inch diameter side inlet that is located about 6 inches from the top of the vessel. The unvaporized liquid flows out of the bottom of the flash tank 42 through a ¾ inch conduit 45 to a fractionator 46. Preferably, an impingement type demister of the sort that is offered for sale from the O. H. York Co., Inc. of Parsippany, N.J. is installed within the flash tank 42 in order to remove liquid droplets from the vapor that leaves the flash tank through a vapor conduit 47. Save for the possible exception of the vapor discharge conduit 47, the top of the fractionator flash tank 42 should be the highest part of the system. In the illustrative embodiment of the invention described herein, the top of the flash tank 42 is about 18 inches higher than the top of the fractionator 46.

The solvent from the flash tank 42 enters the fractionator 46 near the top and flows down to the bottom of the fractionator to a drain 50. The drain 50 introduces the solvent to a reboiler 51. Vaporized solvent from the reboiler 51 then flows up through a conduit 52 and into the bottom of the fractionator 46. The downflowing liquid and the upwardly and counterflowing solvent vapor contact in the fractionator 46 and the carrier gas (or gases), along with some krypton and xenon is driven out of the liquid. This mixture of gases and solvent vapor flows out through the top of the fractionator 42 to a condenser 53 by way of a conduit 54.

In practicing the invention, about 54 psia and 37°F, as well as a molar liquid to gas ratio of 5 should be maintained in the fractionator 46. The fractionator 46, moreover, should contain a column of Goodloe Packing that has a nominal diameter of 3 inches and a height of 9 feet. The solvent is dispersed over the packing by means of a weir-like nozzle, and the packing is supported by a grid.

For the reboiler 51, a cylindrical vessel that is 6 inches in diameter and 3 feet long positioned at the bottom of the fractionator 46 is acceptable. External heating elements (not shown in the drawing) with a total capacity of 3 kilowatts are strapped to the lower half of the reboiler 51 in order to operate at a power density of 20 watts per square inch to provide enough heat (7,200 BTU/hr) to vaporize the downflowing liquid.

It will be recalled that vapor and mixed gases flowed from the fractionator 46 through the conduit 54 to the condenser 53. In an illustrative example of a horizontally disposed cylindrical condenser suitable for use in the system under consideration, the refrigerant is on the finned tube-side of the condenser 53 and the solvent vapor is on the shell-side. The refrigerant in the tubes evaporates and thus cools the solvent vapor. In these circumstances, the shell side pressure is estimated to be 27 psia and the tube side operating pressure is 54 psia. At these pressure conditions the refrigerant evaporation temperature is 5°F.

The maximum refrigerant pressure drop, moreover, is 0.25 psi and for the solvent, 1 psi.

The fractionator condenser 53 has an effective heat transfer area of 40 square feet, a value that is calculated from a log mean temperature difference of 32°F and a duty of 7,200 BTU/hour with an overall heat transfer coefficient of 5.6 BTU/hr-ft²F. A one-ton refrigeration unit (not shown) is capable of providing the necessary cooling for the condenser 53.

The solvent vapor liquifies in the condenser 53 and flows back into the top of the fractionator 46 through a conduit 55 that is connected to the flash tank conduit 45. The noncondensable gases, primarily hydrogen and nitrogen, with some krypton and xenon, are recycled through the system by way of a recycle conduit 56, a valve 57 and the compressor inlet 16.

The solvent, now rich in absorbed krypton and xenon flows from the reboiler 51 through a conduit 60 and a valve 61 to an inlet near the top of a stripper 62.

The stripper 62 is similar in design to the absorber 26 and the fractionator 46. In this respect, a vertically disposed column of Goodloe packing that is 6 inches in diameter and 8 feet high is suitable for the purpose of the invention. Within the stripper 62, the downwardly flowing solvent with the absorbed krypton and xenon contacts an upwardly and counter-flowing fresh solvent vapor that are admitted to the bottom of the stripper 62 from a stripper reboiler 63 by way of a conduit 64.

The process within the stripper 62 is similar to that which occurs in the fractionator 46. Operating the stripper 62, however, at a different molar liquid to gas ratio, a lower pressure and a lower temperature than the fractionator 46, e.g., L/G = 2, 18 psia and −12°F, enables the remaining absorbed gases, the krypton and xenon, to be driven from the liquid solvent. The solvent that flows out of the bottom of the stripper 62 through a conduit 65 to the stripper reboiler 63 is essentially gas-free.

Preferably, the stripper reboiler 63 is a horizontally disposed cylindrical vessel that is 8 inches in diameter and 36 inches long. Electrical heaters with a total capacity of 12 kilowatts are mounted on the outside of the reboiler vessel. Desired results are obtained if six strip heaters are used of the type that are identified as Chromalox Catalog No. SE-3610 strip elements in Section A, Page 9 of the catalog published by Edwin L. Wiegand Division of Emerson Electric Company, Pittsburgh, Pa. 15208. In this situation the strip heaters should be operated at a power density of 20 watts/in².

Fresh solvent also is drawn from the stripper reboiler 63 by way of a conduit 66 and a solvent chiller 67 by means of a pump 70, for flow through a solvent filter 71 and the fluorocarbon liquid inlet 32 to the top portion of the absorber 26. The filter 71 is of the same character and performs the same function as the filter 40.

The chiller 67 may be of a double pipe heat exchanger with an effective heat transfer area of 1 ft². A chiller thermal duty of 1,500 BTU/hr is sufficient to decrease the fresh solvent temperature from −12°F to −25°F. The solvent flows in the tube side and the secondary system refrigerant flows in the outer pipe. Preferably an inner tube diameter of    inch and an outer tube diameter of 1½ inches is suitable for the system under consideration. The relatively large inner diameter tube reduces pressure losses at the inlet to the pump 70 because high decreases in pressure at this point in the system might result in destructive cavitation.

The secondary refrigerant is at a temperature of −40°F for evaporative cooling which results in a log mean temperature difference of 20°F. The operating pressures are 10 psia and 18 psia on the inner and outer tubes, respectively. For an assumed secondary refrigeration system flow rate of 30 lb/hr, with dichlorodifluoromethane, the maximum pressure drop within the inner tube should be 0.1 psi and within the outer tube 0.25 psi.

The pump 70 that circulates the fresh solvent, in the embodiment of the invention under consideration, should be a stainless steel diaphragm device that is able to supply 36 gallons per hour (GPH) at a pressure of 400 psi with a net positive suction head (NPSA) of 3 psia at −27°F. This NPSA assumes that there is no elevation between solvent storage and the inlet to the pump 70. It is further assumed in these illustrative parameters that there is a pressure loss of 1.8 psi between the inlet to the pump 70 and solvent storage.

The pump 70 should be equipped with a stainless steel or other metallic diaphragm because the usual "plastic" or other flexible diaphragm materials tend to deteriorate in response to radiation exposure. Pumps suitable for use in connection with the system described herein are manufactured by Clark-Cooper Corp. of 464 North Randolph Ave., Cinnaminson, N.J. 08077, as well as Lapp and Pressure Product Industries.

After discharge from the pump 70, the solvent liquid flows under pressure through the filter 71 for further impurity removal before the solvent is admitted to the absorber.

It will be recalled that a mixture of krypton and xenon gas was desorbed from the downflowing liquid solvent in the stripper 62. This gas mixture, however, is not entirely pure but may contain solvent vapor and perhaps, some of the carrier gas or gases. To efficiently and economically store the radioactive krypton and xenon, however, it is very important to eliminate, to the extent possible, all of the other non-radioactive or short half-life gases from the long-term storage facility.

Toward this end a stripper condenser 72 is connected in fluid communication with the gases that flow from the top of the stripper 62 through a conduit 73 and a valve 74. The condenser 72, which can be similar in construction to the fractionator condenser 53, condenses any residual solvent vapor that might be entrained in the gas from the stripper 62. The liquified, or condensed solvent vapor flows back into the top portion of the stripper 62 through a conduit 75 that is connected to the conduit 60. In the illustrative embodiment under consideration a stripper condenser duty of 31,000 BUT/hr and a heat transfer area of 130 square feet is suitable.

In accordance with another feature of the invention, the gas from the condenser 72 flows through a conduit 76 to a product dryer 77. The product dryer 77 further reduces unnecessary matter from the krypton and xenon gas mixture, thereby conserving the volume that is needed to store the krypton and xenon on a longterm basis. More specifically, the product dryer 77 removes residual solvent vapor from the gases that are discharged from the stripper condenser 72. For this purpose, a cold trap downstream from the stripper condenser 72 that has a volume of 1 liter and a duty of 50 BTU/hr is capable of reducing the product gas temperature to −110°F and establish the desired degree of krypton and xenon purity.

Further in this same regard, a high purity mixture of krypton and xenon flows from the product dryer 77 through a conduit 81 and a valve 82 to a tee connection 83. The tee connection 83 couples the krypton and xenon gas mixture to a product storage conduit 84 and to a recirculating conduit 85.

A further characteristic of the invention is exemplified in the careful control of the xenon and krypton purity that is maintained through a combination of the tee connection 83, and a product gas radiation meter 86 that controls the operation of a product gas recirculating valve 87 and a product gas storage valve 90. In response to the intensity of the product gas radioactivity, the radiation meter 86 generates a signal that selectively opens and closes the recirculating valve 87 and the storage valve 90. Thus, if a significant amount of solvent is carried over with the product gas, the radiation intensity registered at the meter 86 will change from some pre-established level. In this instance, the radiation meter 86 will generate a signal that shuts the product gas storage valve 90 and opens the product gas recirculating valve 87 to enable the somewhat contaminated product gas to flow through the recirculating conduit to the compressor inlet 16 for reprocessing through the system. If the product radiation intensity is within predetermined limits, however, the radiation meter 86 generates another signal that opens the product gas storage valve 90 and closes the product gas recirculating valve 87 to enable that acceptably pure krypton and xenon gas mixture to flow through the product storage conduit 84 to a suitably shielded and protected gas retention facility.

Thus, there is provided in accordance with the features of this invention, a system for efficiently separating the small, trace quantities of long-lived radioactive krypton and xenon from other nuclear reactor waste gases in order to safely and economically store these gases until the radioactivity decays to a relatively harmless level.

Other fluorocarbon fluids can be used as a solvent for this process. In this circumstance, it might be necessary to modify the process variables to some extent. Stainless steel is, moreover, a preferred structural material for the process described herein.

The embodiments of the invention in which are exclusive property or priviledge is claimed are defined as follows:

1. In a process for purifying radioactive krypton and xenon mixed with a carrier gas that comprises the steps of compressing the gas mixture, contacting the gas mixture with a fluorocarbon solvent to absorb said krypton and xenon and a residual amount of said carrier gas in said solvent thereby to load said solvent, contacting said loaded solvent with more fluorocarbon solvent vapor to separate said residual carrier gas from said loaded solvent and leave a solvent that is rich in radioactive krypton and xenon, contacting said krypton and xenon rich solvent with further fluorocarbon solvent vapor to separate the krypton and xenon gas from said solvent, and drying the krypton and xenon gas to further purify the gas, the improvement comprising registering the radioactivity of said purified gas to selectively store the purified gas when the intensity of the registered radioactivity exceeds a preselected level and reintroduce the purified gas into the process when the intensity of the registered radioactivity is below said level.

2. The process of claim 1 wherein said purified gas is reintroduced to said process by recycling into said radioactive krypton and xenon mixed with a carrier gas.

3. The process of claim 1 wherein an electrical signal is generated when the intensity of the registered radioactivity exceeds said level, said signal effecting opening of a first valve in a line for conveying the purified gas to storage and closing of a second valve in a line for recycling the purified gas to the process.

* * * * *